H. VOELKER.
Improvement in Boiler-Flue Scrapers.
No. 116,118.  Patented June 20, 1871.
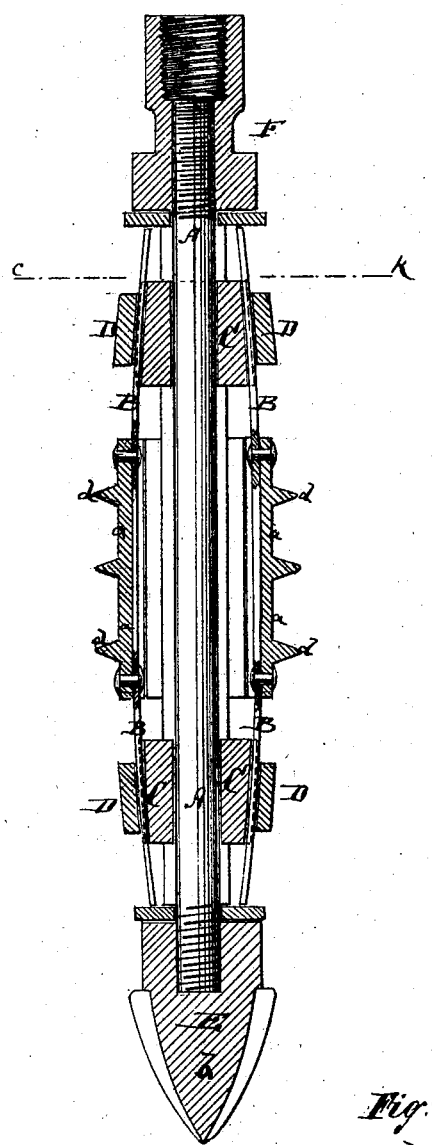
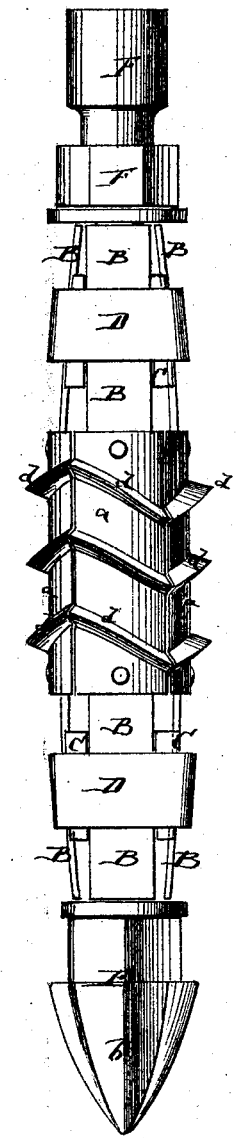
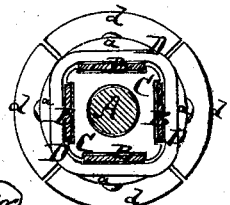

UNITED STATES PATENT OFFICE.

HERMANN VOELKER, OF NEWARK, NEW JERSEY.

IMPROVEMENT IN BOILER-FLUE SCRAPERS.

Specification forming part of Letters Patent No. 116,118, dated June 20, 1871.

*To all whom it may concern:*

Be it known that I, HERMANN VOELKER, of Newark, in the county of Essex and State of New Jersey, have invented a new and Improved Boiler-Flue Scraper; and I do hereby declare that the following is a full, clear, and exact description thereof, which will enable others skilled in the art to make and use the same, reference being had to the accompanying drawing forming part of this specification, in which—

Figure 1 represents a longitudinal central section of my improved boiler-flue scraper. Fig. 2 is a side view of the same. Fig. 3 is a transverse section of the same on the line $c\ k$, Fig. 1.

Similar letters of reference indicate corresponding parts.

This invention relates to several improvements in boiler-tube cleaners of that class where a series of scrapers is attached to springs that are secured to the axle or stem of the tool. The invention consists, first, in the application of sliding heads to the said stem, and in the combination therewith of sliding sleeves for clamping the ends of the springs, and thereby securing them without screws or pins that pierce them. The invention also consists in the combination, with said sliding heads and sleeves, of fastening-nuts, which serve, also, respectively, as shanks and points of the scraper. Finally, the invention consists in placing the scrapers in zigzag courses around the tool, whereby more effective operation is attained.

A in the drawing represents the central stem or shank of the boiler-flue scraper. B B' are the four, more or less, springs, carrying the scraping-tools $a\ a$. C C are two sliding heads, fitted loose upon the stem, and made slightly conical and grooved, to receive and properly hold apart the ends of the springs. D D are two sleeves with tapering openings, for clamping the springs to the heads C. The springs, which are nearly flat, are, near their ends, fitted into the grooves of the heads C, and then held fast by the sleeves D. This makes quite a reliable fastening, and does away with the use of separate screws, which were heretofore required for securing the springs to projecting shoulders of the stem, and which weakened the springs, besides interfering with their elasticity. Upon one end of the stem A is screwed a nut, E, which terminates in a pointed head, $b$. A nut, F, is screwed upon the other end of the stem, and serves, also, as a coupling between the stem and the handle of the tool. These two nuts are screwed against the ends of the springs B, as shown, to prevent their longitudinal displacement. The scraping-tools $a\ a$, which are riveted or otherwise secured to the middle portions of the springs B, have projecting ribs $d\ d$, which are provided with scraping or cutting edges, and are set oblique, as shown in Fig. 2, so as to make zigzag rows of scrapers. This will enable the latter to work continuously and with better effect than if set transversely against the springs in the ordinary manner.

Having thus described my invention, I claim as new and desire to secure by Letters Patent—

1. The sliding heads C C, applied loosely to the stem A to receive the springs B, and combined with the sliding sleeves D D, substantially as herein shown and described.
2. The nuts E and F, applied to the ends of the stem to retain the springs, in combination with the heads C and sleeves D, and so shaped as to constitute, respectively, the point and coupling of the stem, as set forth.
3. The scrapers $d$, arranged in zigzag rows around and upon the springs B, substantially as herein shown and described.

The above specification of my invention signed by me this 1st day of May, 1871.

HERMANN VOELKER.

Witnesses:
GEO. W. MABEE,
T. B. MOSHER.